April 21, 1953     G. E. HANSEN     2,635,903
VALVE STEM VACUUM SEAL
Filed June 10, 1950
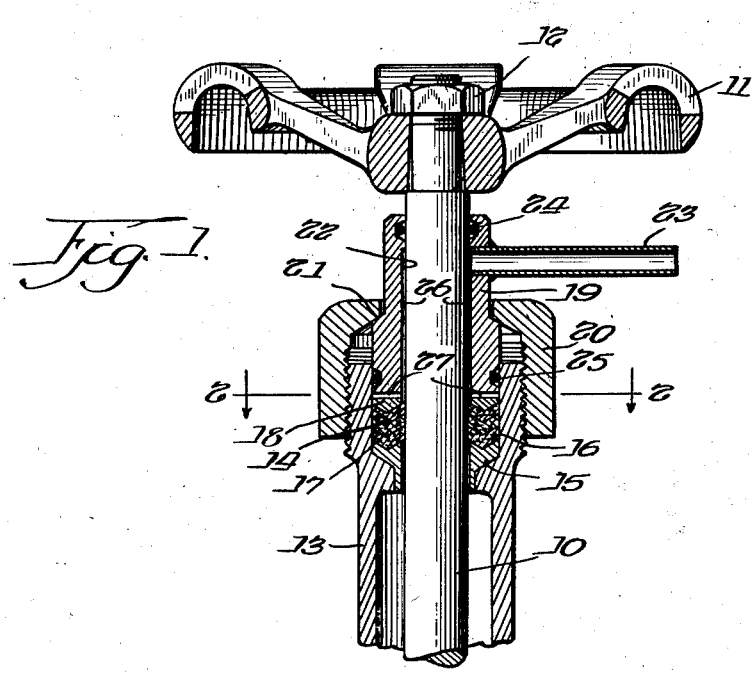
Inventor:
George E. Hansen.
By Joseph O. Lange
Atty.

Patented Apr. 21, 1953

2,635,903

UNITED STATES PATENT OFFICE 2,635,903

VALVE STEM VACUUM SEAL

George E. Hansen, Chicago, Ill., assignor to Crane Co., Chicago, Ill., a corporation of Illinois Application June 10, 1950, Serial No. 167,295

2 Claims. (Cl. 286—27)

This invention pertains to a shaft vacuum seal, and, more specifically, it pertains to a vacuum seal located around a valve stem or the like whereby fluid entering the said valve is intercepted by the said vacuum seal and carried away.

An object of this invention is to provide a vacuum seal to be employed in connection with a vacuum valve or the like, to thereby prevent fluid infiltration into the vacuum line.

Other objects and advantages will become more readily apparent upon reading the following description in light of the accompanying drawings, in which:

Fig. 1 is a fragmentary sectional assembly view of an upper portion of a valve showing a preferred embodiment of this invention.

Fig. 2 is an enlarged sectional view taken on a line 2—2 of Fig. 1.

Similar reference numerals refer to similar parts in the several views.

In Fig. 1, the upper portion of a valve is shown employing a preferred embodiment of this invention. For the purpose of a description of this invention, it is not deemed necessary to show the lower portion of the said valve as that is of a conventional structure. The particular vacuum seal of this invention is suitable for any structure wherein a stem or rod is inserted into a vacuum line, and it is desired to prevent any possible fluid infiltration into the said vacuum line.

Thus, in Fig. 1 is shown a conventional stem 10 which, in addition to being rotatable, may, of course, be of the rising or non-rising type. Connected to the top of the stem 10, to actuate the same, is the usual handwheel 11 secured thereto by means of a nut 12, threaded into the stem 10. The usual bonnet 13 is shown mounted around the stem 10 to enclose a portion of the same. The bottom of the bonnet 13 is threaded into the valve body (not shown) to be fluidtight therewith in the usual manner. An upper inner portion 14 of the bonnet 13 is relieved to receive a stuffing box bushing or an adapter 15 which is bored as illustrated to mount relatively snugly over the stem 10. The upper face 16 of the adapter 15 is depressed or formed to support what is termed a chevron packing 17 over which an adapter or washer 18 is located. A gland 19, mounted around the stem 10, abuts the top face of the second adapter member or washer 18, and a threaded packing nut 20 abuts a shoulder 21 of the gland 19, threadedly engaging the bonnet 13 to effect this assembly of the upper portion of the valve.

With more particularity in describing this invention, a fluid seal means consisting of an O-ring 24 is disposed between the stem 10 and the upper portion of the gland 19, and another O-ring 25 is located between the lower portion of the gland 19 and the bonnet 13 in the respective grooves, as illustrated. The top face of the adapter 18 is preferably provided with four equally spaced radially extending transverse grooves 27, as shown in Fig. 2. The lower portion of the gland 19 contains a counterbore 22 to provide a chamber 26 between the stem 10 and the gland 19. A tube 23 extends through the gland 19 to communicate with the chamber 26, while the opposite end of the tube 23 is connected to a vacuum pump (not shown).

It should here be understood that only two possible passageways exist for any fluid to enter the upper portion of the valve. Fluid passing O-ring 24 will enter the chamber 26 and be exhausted therefrom through the vacuum tube 23, while fluid passing the O-ring 25 will pass through the adapter grooves 27 and into the chamber 26 and then exhaust through the tube 23.

Thus, there has been provided a positive means of preventing any fluid from entering the upper portion of a valve operating in a vacuum line, effectively preventing undesirable infiltration.

Although this invention has been described in but one specific form, it should not be so limited as it is susceptible to changes and should be limited only by the spirit thereof and the scope of the appended claims.

I claim:

1. A valve stem vacuum seal comprising a valve stem, a bonnet member surrounding a portion of the said stem and suitably connecting with the valve body, a packing material in fluidtight relation with a portion of the said stem, a plurality of adapters, one of said adapters being positioned above the said packing and having a plurality of radially extending grooves across the top surface thereof, a gland having a projecting portion and forming said annular chamber with said stem and abutting the said adapter grooved face, the said chamber communicating with the said grooves, a vacuum tubular member extending into the projecting portion of the said gland communicating with the said chamber, inner and outer means on the said gland for sealing the said chamber and adapter in substantial fluidtightness with the exterior of the valve.

2. A valve stem vacuum seal comprising a valve stem, a packing gland mounted around a portion of the said valve stem to provide a chamber therebetween, a packing material in fluidtight relation with at least a portion of the said stem, upper and lower adapters mounted around the said stem above and below said packing material and with the upper one of the adapters having a plurality of radial grooves therein to register with the said chamber, vacuum means cooperating with the said gland communicating with the said chamber, pressure actuated sealing means on inner and outer peripheral portions of the said packing gland for maintaining the said chamber and the said adapter respectively in substantial fluidtight condition with relation to fluid pressure external to the said valve.

GEORGE E. HANSEN.

References Cited in the file of this patent

UNITED STATES PATENTS

| Number | Name | Date |
|---|---|---|
| 313,180 | Colwell | Mar. 3, 1885 |
| 1,582,786 | Rhodes | Apr. 27, 1926 |
| 2,369,249 | Rainalter | Feb. 13, 1945 |